United States Patent
Boscolo Berto et al.

(10) Patent No.: US 11,855,554 B2
(45) Date of Patent: Dec. 26, 2023

(54) METHOD OF DRIVING AN ELECTRICAL LOAD AND CORRESPONDING DRIVER CIRCUIT

(71) Applicant: STMicroelectronics S.r.l., Agrate Brianza (IT)

(72) Inventors: Michele Boscolo Berto, Milan (IT); Ezio Galbiati, Cremona (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/819,504

(22) Filed: Aug. 12, 2022

(65) Prior Publication Data

US 2023/0074792 A1 Mar. 9, 2023

(30) Foreign Application Priority Data

Sep. 9, 2021 (IT) .................. 102021000023336

(51) Int. Cl.
*H02M 7/537* (2006.01)
*H02M 1/32* (2007.01)
*H02P 6/16* (2016.01)

(52) U.S. Cl.
CPC ............ *H02M 7/537* (2013.01); *H02M 1/32* (2013.01); *H02P 6/16* (2013.01)

(58) Field of Classification Search
CPC .................................................. H02M 7/537
USPC .......................................................... 327/108
See application file for complete search history.

(56) References Cited

U.S. PATENT DOCUMENTS

| | | | |
|---|---|---|---|
| 5,793,180 A | 8/1998 | Maiocchi et al. | |
| 5,838,128 A | 11/1998 | Maiocchi et al. | |
| 6,841,903 B2 | 1/2005 | Boscolo et al. | |
| 6,949,906 B2 | 9/2005 | Boscolo et al. | |
| 7,332,886 B2 | 2/2008 | Maiocchi et al. | |
| 8,970,150 B2 | 3/2015 | Boscolo | |
| 10,250,172 B2 | 4/2019 | Boscolo Berto | |
| 10,622,898 B1 * | 4/2020 | Henzler | H02M 3/1582 |
| 11,005,397 B2 | 5/2021 | Boscolo Berto | |
| 2003/0206386 A1 | 11/2003 | Hill et al. | |
| 2014/0266128 A1 | 9/2014 | Vinayak et al. | |

* cited by examiner

*Primary Examiner* — Tomi Skibinski
(74) *Attorney, Agent, or Firm* — Slater Matsil, LLP (57) ABSTRACT

A method of driving an electrical load includes coupling a power supply source to a power supply pin of a driver circuit, and coupling an electrical load to at least one output pin of the driver circuit. A driver sub-circuit of the driver circuit produces at least one driving signal for driving the electrical load. The at least one driving signal is provided to the electrical load via the at least one output pin. The at least one driving signal is modulated to supply the electrical load with a load current and to subsequently interrupt the load current. A compensation current pulse is sunk from the power supply pin, at a compensation circuit of the driver circuit, in response to the load current being interrupted.

20 Claims, 7 Drawing Sheets

FIG. 7D

METHOD OF DRIVING AN ELECTRICAL LOAD AND CORRESPONDING DRIVER CIRCUIT

CROSS-REFERENCE TO RELATED APPLICATIONS

This application claims priority to Italian Patent Application No. 102021000023336, filed on Sep. 9, 2021, which application is hereby incorporated by reference herein in its entirety.

TECHNICAL FIELD

The present disclosure generally relates to circuits, and in particular embodiments, to methods and circuits for driving electrical loads.

BACKGROUND

In driving electrical loads, there are some cases where the current sunk by the load may be abruptly interrupted.

An inductive sense procedure applied to a brushless direct current (BLDC) motor for detecting the angular position of the motor is an example of one such case. An inductive sense procedure may be conventionally applied during the startup phase of the BLDC motor for hard disk drive (HDD) applications. Generally, the inductive sense procedure relies on generating current pulses in the electrical load (e.g., one or more of the windings of a BLDC motor) and analyzing the effects thereof (e.g., detecting the period necessary for reaching a certain current threshold in response to the applied voltage pulse, detecting the period necessary for completely discharging the load after application of the current pulse, or detecting mutual inductance effects at different terminals of the load).

Inductive sense procedures based on detecting the period necessary for completely or partially discharging the load after application of the current pulse are known, for instance, from U.S. Pat. Nos. 6,841,903 and 10,250,172 assigned to the Applicant of the instant application.

Inductive sense procedures based on detecting the period necessary for reaching a certain current threshold in response to the applied voltage pulse combined with the period necessary for completely discharging the load current are known, for instance, from U.S. Pat. No. 8,970,150 assigned to the Applicant of the instant application.

Inductive sense procedures based on detecting mutual inductance effects are known, for instance, from U.S. Pat. No. 11,005,397 assigned to the Applicant of the instant application.

Such known inductive sense procedures entail the abrupt interruption of the current sunk by the load, which may result in a negative current pulse being produced in the power supply line. The magnitude (e.g., peak value) of such a negative current pulse may be comparable to the magnitude of the current pulse injected into the load.

Therefore, there is a need in the art to provide improved driving methods and driver circuits for electrical loads that facilitate mitigating (e.g., reducing or possibly eliminating) the negative current pulses produced in the power supply line when the current sunk by the load is abruptly interrupted. Such a need may be felt particularly in applications that use low-end power supplies, which may not have the current sinking capability and may not be able to withstand negative currents.

SUMMARY

An object of one or more embodiments is to contribute to providing such improved driving methods and driver circuits for electrical loads.

According to one or more embodiments, such an object can be achieved by a method having the features set forth in the claims that follow.

One or more embodiments may relate to a corresponding driver circuit.

The claims are an integral part of the technical teaching provided herein in respect of the embodiments.

In one or more embodiments, a method includes coupling a power supply source to a power supply pin of a driver circuit and coupling an electrical load to at least one output pin of the driver circuit. The method includes producing at least one driving signal for driving the electrical load at a driver sub-circuit of the driver circuit. The method includes providing the at least one driving signal to the electrical load via the at least one output pin. The method includes modulating the at least one driving signal to supply the electrical load with a load current and subsequently interrupt the load current. The method includes sinking from the power supply pin, at a compensation circuit of the driver circuit, a compensation current pulse in response to the load current being interrupted.

One or more embodiments thus facilitate mitigating or canceling negative current pulses in the power supply line when the load current is interrupted.

In one or more embodiments, the compensation circuit includes a voltage clamp circuit coupled to the driver sub-circuit of the driver circuit. In these embodiments, the method includes selectively activating the voltage clamp circuit to sink the compensation current pulse from the power supply pin in response to the load current being interrupted.

In one or more embodiments, the compensation current pulse is a square compensation current pulse.

In embodiments, the square compensation current pulse has a predetermined (e.g., calibrated) magnitude and duration in one or more embodiments.

In one or more embodiments, the compensation current pulse has a falling slew rate lower than a rising slew rate, optionally at least ten times lower, optionally at least one hundred times lower.

In one or more embodiments, modulating the at least one driving signal to supply the electrical load with a load current and to subsequently interrupt the load current includes, in a first phase, applying a non-zero voltage between a first terminal and a second terminal of the electrical load, and in a second phase, applying the same potential to the first terminal and the second terminal of the electrical load; thereby, setting the electrical load in a short-circuit configuration. In these embodiments, the method includes sinking the compensation current pulse in response to the start of the second phase.

In one or more embodiments, modulating the at least one driving signal to supply the electrical load with a load current and subsequently interrupt the load current further includes, in a third phase, setting the first terminal and the second terminal of the electrical load to a high impedance state upon expiration of the compensation current pulse.

In one or more embodiments, a circuit includes a power supply pin configured to be coupled to a power supply source and at least one output pin configured to be coupled to an electrical load. The circuit includes a driver sub-circuit configured to produce at least one driving signal at the at least one output pin for driving the electrical load and to modulate the at least one driving signal to supply the electrical load with a load current and to subsequently interrupt the load current. The circuit includes a compensation circuit configured to sink a compensation current pulse from the power supply pin in response to the load current being interrupted.

In one or more embodiments, the compensation circuit includes a voltage clamp circuit coupled to the driver sub-circuit, and the driver circuit further includes a logic circuit configured to selectively activate the voltage clamp circuit to sink the compensation current pulse from the power supply pin in response to the load current being interrupted.

In one or more embodiments, the compensation circuit is configured to sink a square compensation current pulse from the power supply pin.

The square compensation current pulse has a predetermined (e.g., calibrated) magnitude and duration in one or more embodiments.

In one or more embodiments, the compensation circuit is configured to sink from the power supply pin a compensation current pulse having a falling slew rate lower than a rising slew rate, optionally at least ten times lower, optionally at least one hundred times lower.

In one or more embodiments, the at least one output pin may include a first output pin and a second output pin. In these embodiments, the driver sub-circuit is configured to apply a non-zero voltage between the first and the second output pin in the first phase and the same potential to the first and second output pin in the second phase, thereby setting the electrical load in a short-circuit configuration. In such embodiments, the compensation circuit is configured to sink the compensation current pulse in response to the start of the second phase.

In one or more embodiments, the driver sub-circuit is configured to set the first output pin and the second output pin to a high impedance state upon expiry of the compensation current pulse in the third phase.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular configurations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like parts or elements are indicated with like references/numerals and a corresponding description will not be repeated for the sake of brevity.

Figure 1A:
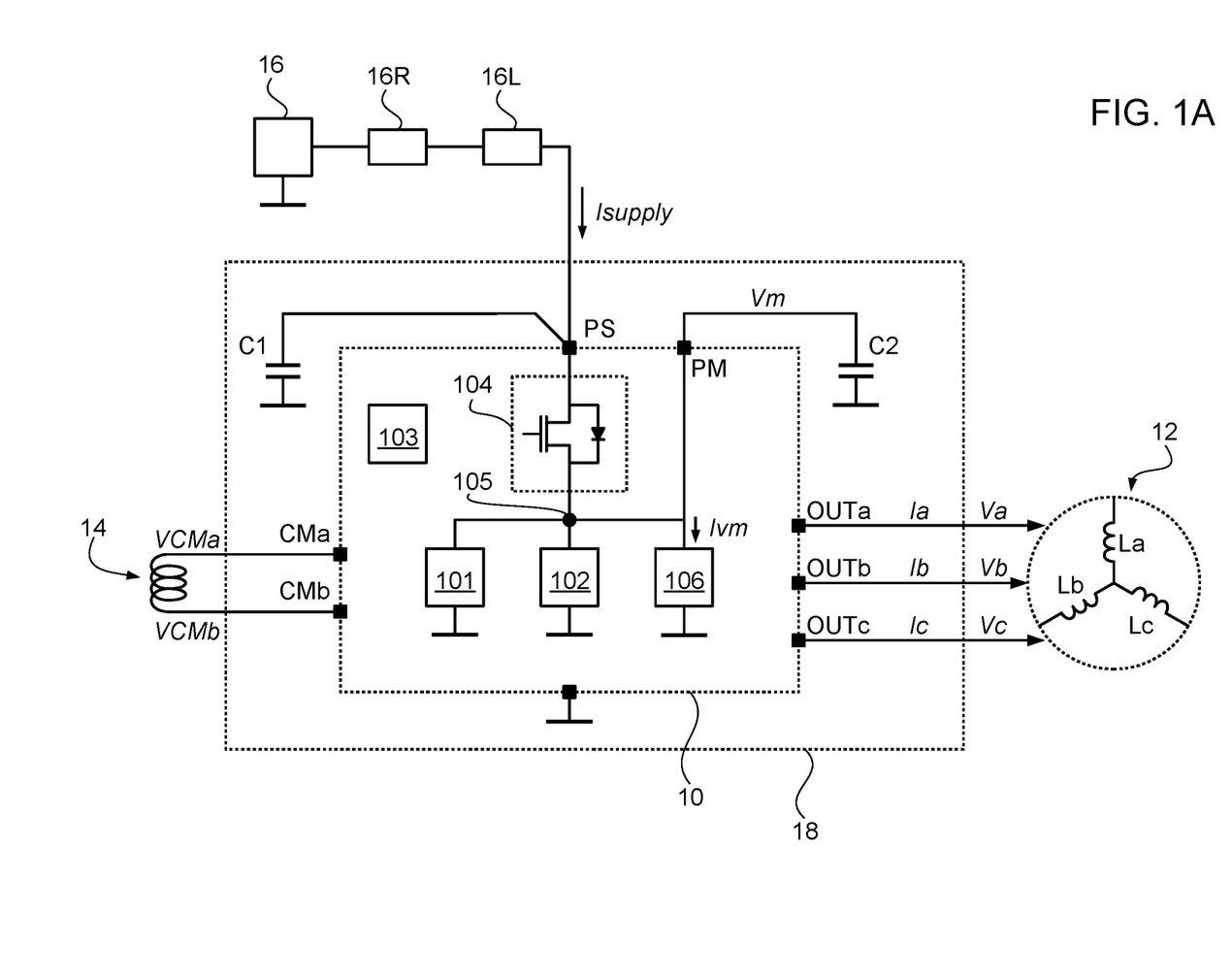
FIG. 1A is a circuit block diagram exemplary of a driver circuit for driving one or more electrical loads, according to one or more embodiments of the present description.

By way of introduction to the detailed description of exemplary embodiments, reference may first be made to FIG. 1A, which is a circuit block diagram exemplary of a driver circuit 10 for driving one or more electrical loads. In particular, the driver circuit 10 may be coupled to a hard disk drive (HDD) comprising a three-phase BLDC motor 12 (e.g., a spindle motor of the hard disk drive, which causes the disks to rotate) and/or an actuator 14 (e.g., a voice coil actuator of the hard disk drive, which moves the read/write heads).

The driver circuit 10 is configured to produce driving signals Va, Vb, and Vc at respective output pins OUTa, OUTb, and OUTc for driving the three-phase BLDC motor 12. In particular, the BLDC motor 12 may include three windings La, Lb, and Lc (e.g., arranged in a star configuration), each coupled to a respective one of the output pins OUTa, OUTb, and OUTc of the driver circuit 10.

Additionally, the driver circuit 10 is configured to produce driving signals VCMa and VCMb at respective output pins CMa and CMb for driving the actuator 14. In particular, the actuator 14 may include an inductive load coupled between the output pins CMa and CMb of the driver circuit 10.

The driver circuit 10 includes a power supply pin PS couplable to a power supply source 16 (e.g., a 12 V power supply) to receive a supply current Isupply. As exemplified in FIG. 1A, the electrical connection (e.g., wiring) between the power supply source 16 and the power supply pin PS may include a resistive component 16R or an inductive component 16L.

The driver circuit 10 includes a first driver sub-circuit 101 coupled between the power supply pin PS and a reference (e.g., ground) terminal of the driver circuit 10, a second driver sub-circuit 102 coupled between the power supply pin PS and the reference terminal of the driver circuit 10, and a logic circuit 103. The first driver sub-circuit 101 may be controlled by the logic circuit 103 to produce the driving signals VCMa and VCMb for the actuator 14. The second driver sub-circuit 102 may be controlled by the logic circuit 103 to produce the driving signals Va, Vb, and Vc for the BLDC motor 12. For instance, the second driver sub-circuit 102 may include three half-bridge circuit arrangements; each coupled to a respective one of the output pins OUTa, OUTb, and OUTc to drive them.

Additionally, driver circuit 10 includes a protection circuit 104 (e.g., an isolation transistor or ISOFET) coupled between the power supply pin PS and each of the driver sub-circuits 101 and 102 (e.g., between the power supply pin PS and a node 105 coupled to the positive terminals of the driver sub-circuits 101 and 102). The protection circuit 104 may be controlled by the control circuit 103 so that the driver sub-circuits 101 and 102 are disconnected from the power supply pin PS if an emergency condition is detected (e.g., if a reverse current is detected).

The driver circuit 10 may further include a voltage clamp circuit 106 coupled between the node 105 and the reference terminal of the driver circuit 10 (e.g., in parallel to the driver sub-circuits 101 and 102). The voltage clamp circuit 106 may be configured to cap (e.g., limit) the voltage Vm at node 105 (e.g., across the driver sub-circuits 101 and 102). For this purpose, the positive terminal of the voltage clamp circuit 106 may be coupled to a pin PM of the driver circuit 10, which in turn may be coupled to an external capacitor C2. The voltage clamp circuit 106 may be configured to avoid the voltage Vm at node 105 exceeding a certain threshold (e.g., limit), thereby avoiding damage to the circuits embedded in the driver circuit 10.

Figure 1B:
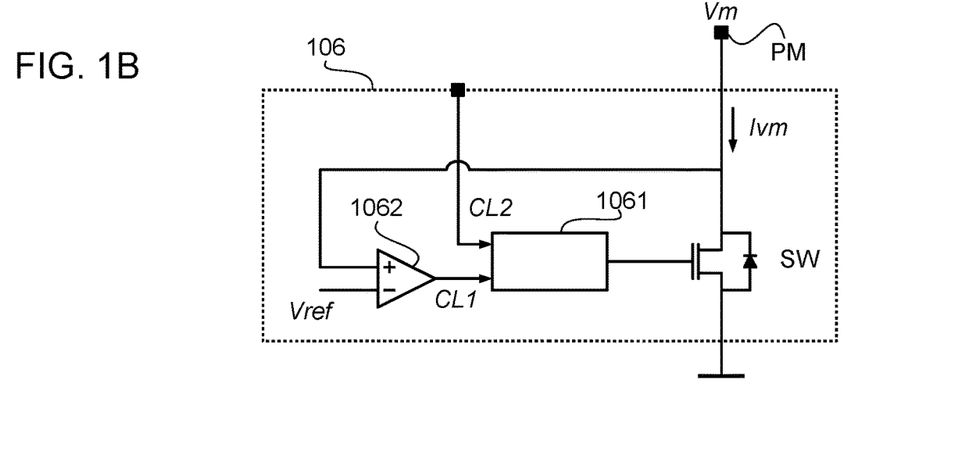
FIG. 1B is a circuit block diagram exemplary of a voltage clamp circuit for use in a driver circuit according to one or more embodiments of the present description.

As exemplified in FIG. 1B, the voltage clamp circuit 106 may include a selectively activatable switch SW (e.g., a MOS transistor) arranged between the pin PM and the reference terminal. The switch SW may be controlled by a driver circuit 1061. An operational amplifier 1062 (e.g., error amplifier) may receive at a first (e.g., non-inverting) input terminal the voltage Vm from pin PM and at a second (e.g., inverting) input terminal a reference (e.g., threshold) voltage Vref. The operational amplifier 1062 may produce a first clamp activation signal CL1 indicative of (e.g., proportional to) the difference (e.g., sensed error) between voltage Vm and voltage Vref. The driver circuit 1061 may control the switch SW as a function of the first clamp activation signal CL1, e.g., linearly controlling the conductivity of transistor SW. Additionally, the voltage clamp circuit 106 may be controlled by the control circuit 103. In particular, the driver circuit 1061 may control the conductivity of the switch SW as a function of a second clamp activation signal CL2 (e.g., an auxiliary clamp activation signal), where the second clamp activation signal CL2 is received from the control circuit 103.

As exemplified in FIG. 1A, the driver circuit 10 may be mounted on a printed circuit board (PCB) 18. A reference (e.g., ground) pin of the driver circuit 10 may be coupled to a reference (e.g., ground) pin of the PCB 18. The motor 12 and the actuator 14, as well as the power supply source 16, may be external to the PCB 18. A first capacitor C1 may be provided on the PCB 18, coupled between the power supply pin PS of the driver circuit 10 and the reference pin of the PCB 18. A second capacitor C2 may be provided on PCB 18, coupled between the voltage clamp pin PM of the driver circuit 10 and the reference pin of PCB 18.

U.S. Pat. Nos. 5,793,180, 5,838,128, 6,949,906, and 7,332,886, incorporated by reference herein in their entirety, disclose various aspects of driver circuits suitable for hard disk drive applications, making it unnecessary to provide herein a more detailed description of the driver circuit 10.

As previously discussed, the driver circuit 10, as exemplified in FIG. 1A, may be configured to execute an inductive sense procedure to detect the angular position of the BLDC motor 12 (e.g., during the startup phase of the BLDC motor 12). Performing an inductive sense procedure may improve the startup phase's reliability or efficiency.

Inductive sense procedures known in the art (e.g., as disclosed in U.S. Pat. Nos. 11,005,397, 6,841,903, 10,250, 172 and 8,970,150, incorporated by reference herein in their entirety, previously cited) rely on applying an ordered sequence of current pulses to the windings of the BLDC motor 12, starting from a known initial current value that, for simplicity, is usually chosen to be zero. Therefore, the current flowing in the windings La, Lb, and Lc has to be zeroed before applying the current pulses of the inductive sense procedure sequence.

According to a first approach, the current flowing in a motor winding can be zeroed by forcing the respective driver circuit (e.g., a respective half-bridge circuit included in the driver sub-circuit 102) to a high impedance (HiZ) state (e.g., with both the high-side switch or transistor and the low-side switch or transistor set to a non-conductive state) while keeping the protection circuit 104 in a conductive state. By doing so, the current flowing in the respective motor winding can be rapidly zeroed, but a relevant (impulsive) negative current may be produced in the power supply line 16, 16R, and 16L.

Figure 2A:
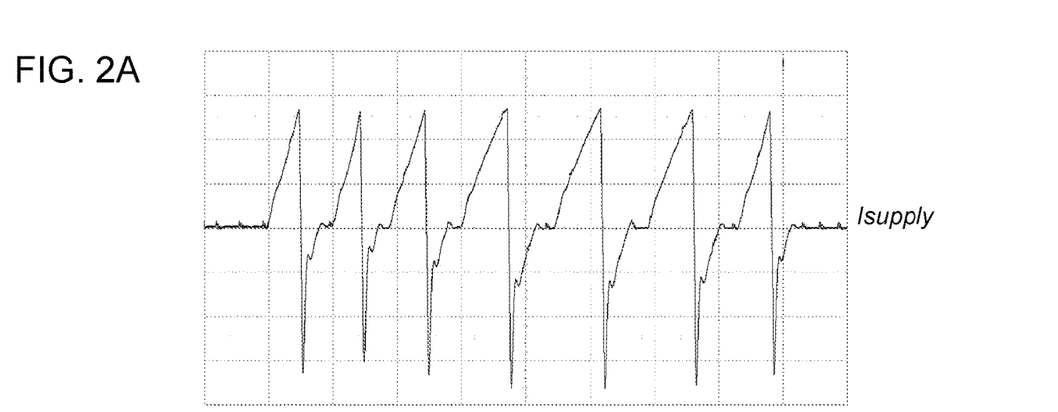
FIGS. 2A and 2B are time diagrams exemplary of a supply current and a load current, respectively, during a conventional inductive sense procedure of a BLDC motor.

FIG. 2A is a time diagram exemplary of the supply current Isupply flowing in the power supply lines 16, 16R, and 16L during an inductive sense procedure according to such a first approach.

Figure 2B:
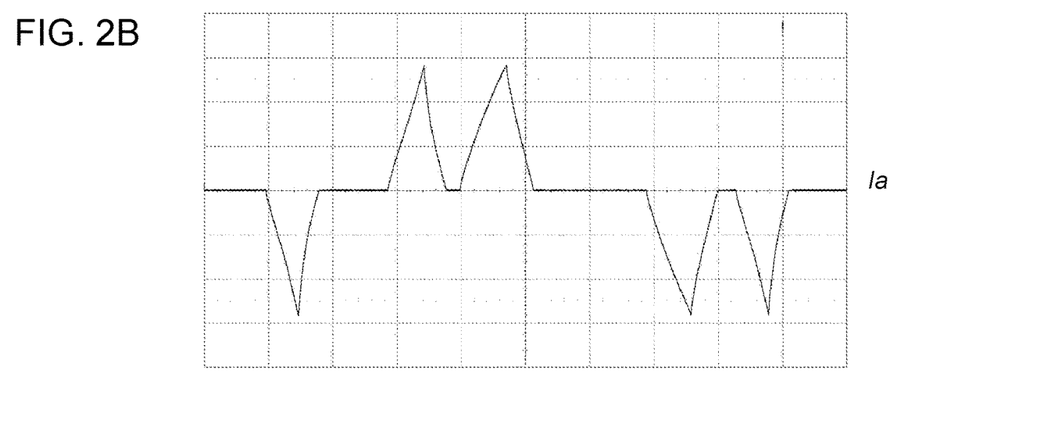

FIG. 2B is a corresponding time diagram exemplary of the motor coil current Ia (i.e., the current flowing through one of the motor windings, such as La) during an inductive sense procedure according to such a first approach.

The motor coil currents Ib and Ic flowing through the other motor windings Lb and Lc are not shown for ease of illustration only. As exemplified in FIGS. 2A and 2B, zeroing the load current (e.g., the motor coil current Ia) results in a negative current pulse in the power supply lines 16, 16R, and 16L. The negative current pulse may have a magnitude comparable to the load current pulse. Similar negative current pulses are produced when zeroing the motor coil current in the other motor windings Lb and Lc, as shown in FIG. 2A.

Figure 3A:
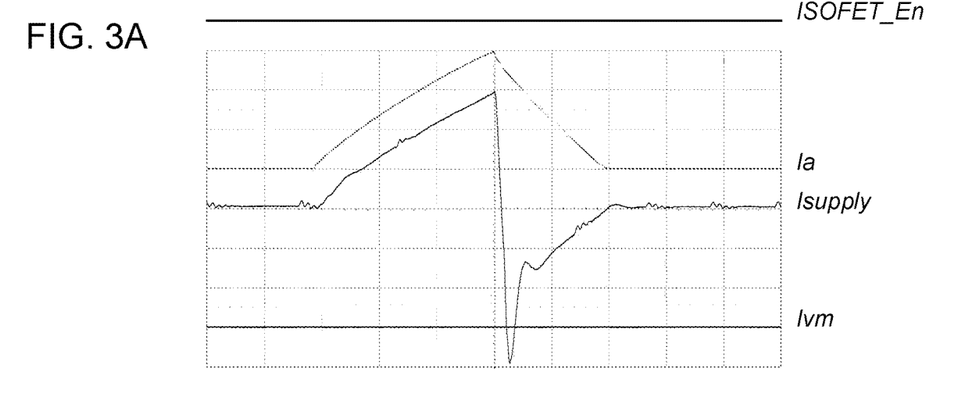
FIG. 3A is a time diagram exemplary of a load current, a supply current and a compensation current during a conventional inductive sense procedure of a BLDC motor according to a first approach.

FIG. 3A is a further time diagram exemplary of the load current Ia flowing through to the winding La of the motor 12, the supply current Isupply flowing through the power supply lines 16, 16R, and 16L, and the current Ivm flowing through the voltage clamp circuit 106 during a single current pulse of an inductive sense procedure according to the first approach described above. It is noted that a relevant negative current pulse is produced in the power supply line (current Isupply) when the load current Ia is zeroed. Substantially no current flows in the voltage clamp circuit 106. The protection circuit 104 is kept in a conductive state, as exemplified by the logic (enable) signal ISOFET_En, which is kept at a high logic value.

According to a second approach, the negative current pulses in the power supply lines 16, 16R, and 16L can be mitigated by resorting to a unidirectionally-conductive element arranged in series to the power supply line to block the propagation of negative currents. In driver circuit 10, as exemplified in FIG. 1A (e.g., for HDD applications), such a unidirectional element can be provided by the protection circuit 104.

Therefore, such a second approach for zeroing the load current relies on forcing the driver sub-circuit 102 to a high impedance state while setting the protection circuit 104 in a non-conductive state. A drawback of such a second approach is that an overvoltage may be generated inside the driver circuit 10 (e.g., across the driver sub-circuit 102). Therefore, clamping capacitors or clamping circuits (active or passive) may be provided in driver circuit 10 to clamp the internal voltage to a maximum allowed value.

Figure 3B:
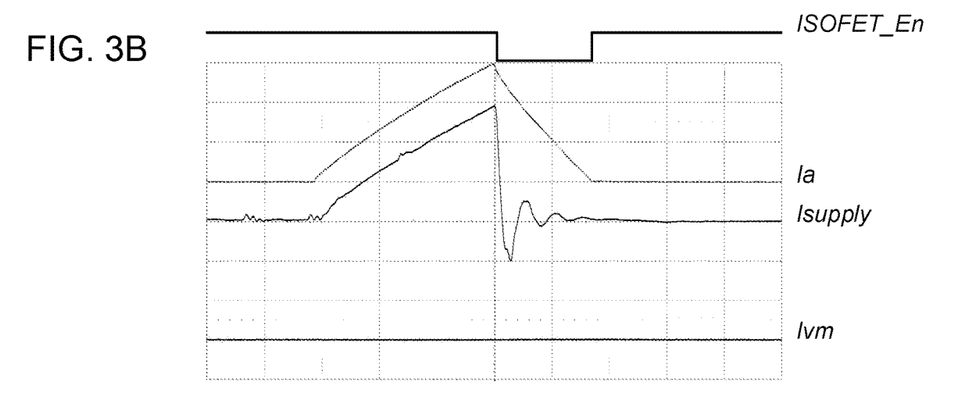
FIG. 3B is a time diagram exemplary of a load current, a supply current and a compensation current during a conventional inductive sense procedure of a BLDC motor according to a second approach.

FIG. 3B is a time diagram exemplary of the load current Ia flowing through the winding La of the motor 12, the supply current Isupply flowing through the power supply lines 16, 16R, and 16L, and the current Ivm flowing through the voltage clamp circuit 105 during a single current pulse of an inductive sense procedure according to the second approach described above. It is noted that a negative current pulse may still be produced in the power supply line (current Isupply) when the load current Ia is zeroed. However, mitigation of the negative current pulse can be achieved with respect to the case exemplified in FIG. 3A. Substantially no current flows in the voltage clamp circuit 106. The protection circuit 104 is driven to a non-conductive state while the load current Ia decreases to zero, as exemplified by signal ISOFET_En, which is driven to a low logic value during the discharge phase of the load current Ia.

According to a third approach, the load current flowing in the windings La, Lb, and Lc can be zeroed by forcing the motor windings in a short-circuit configuration. In such a case, the load current does not flow towards the power supply lines 16, 16R, and 16L but recirculates in the motor windings themselves (i.e., in the load). A drawback of such a third approach is that the load current discharges rather slowly, depending on the electrical characteristics of the motor 12 (e.g., according to a time constant that depends on the inductance to resistance ratio of the windings, L/R).

According to a fourth approach, the current flowing in a motor winding can be zeroed by initially forcing the motor windings in a short-circuit configuration and subsequently forcing the respective driver sub-circuit 102 to a high impedance state while setting the protection circuit 104 in a non-conductive state. By doing so, the load current initially decreases by dissipating in the motor windings (without producing an overvoltage in the driver circuit 10 or a negative current in the power supply lines 16, 16R, and 16L). The driver sub-circuit 102 is forced to a high impedance state (only) when the load current has reached a lower value, thereby further mitigating the generation of negative current pulses in the power supply lines 16, 16R, and 16L.

Figure 3C:
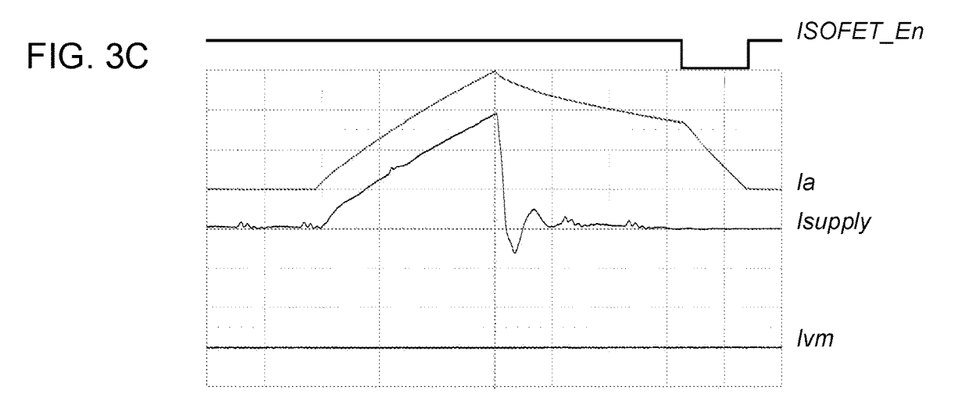
FIG. 3C is a time diagram exemplary of a load current, a supply current and a compensation current during a conventional inductive sense procedure of a BLDC motor according to a third approach.

FIG. 3C is a time diagram exemplary of the load current Ia flowing through the winding La of the motor 12, the supply current Isupply flowing through the power supply lines 16, 16R, and 16L, and the current Ivm flowing through the voltage clamp circuit 106 during a single current pulse of an inductive sense procedure according to the fourth approach described above. It is noted that a negative current pulse may still be produced in the power supply line (current Isupply) when the load current Ia is zeroed. However, mitigation of the negative current pulse can be achieved with respect to the cases exemplified in FIGS. 3A and 3B.

Substantially no current flows in the voltage clamp circuit 106. The protection circuit 104 is kept in a conductive state in the first portion of the current discharge phase, while the motor windings are in a short-circuit configuration (also referred to as the "spindle brake phase"). It is subsequently driven to a non-conductive state when the driver sub-circuit 102 is forced to a high impedance state, and the load current Ia rapidly decreases to zero (also referred to as the "high impedance phase"). This is exemplified by signal ISOFET_En, which is driven to a high logic value during a first (e.g., initial) portion of the load current discharge phase and to a low logic value during a second (e.g., final) portion of the load current discharge phase.

In all the cases discussed with reference to FIGS. 3A, 3B, and 3C, an abrupt interruption of the load current may result in voltage oscillations in the power supply line and thus negative current pulses in the power supply lines 16, 16R, and 16L. Such oscillations may be due to the wiring between the power supply source 16 and the driver circuit 10 being not purely resistive but including an inductive or a capacitive component.

For instance, the inductive component may result from the inductance of the wiring itself, and the capacitive component may result from the provision of filtering capacitors on PCB 18 or in the driver circuit 10. While some approaches may mitigate the negative current pulses in the power supply line (compare, e.g., FIGS. 3A, 3B, and 3C), further improvements in this respect are desirable, with the aim of further reducing (e.g., virtually avoiding) the negative current pulses in the power supply line.

One or more embodiments may thus rely on the provision of a compensation (e.g., auxiliary) circuit in the driver circuit 10, the compensation circuit being selectively controllable to sink a (small) compensation current from the power supply pin PS when the load current is interrupted (e.g., abruptly). By doing so, negative current pulses in the power supply lines 16, 16R, and 16L can be reduced or avoided insofar as the overall supply current Isupply can be determined as the sum of the load current and the compensation current. The compensation circuit may be activated to sink such a compensation current for a short period according to various control principles, as further disclosed in the following.

In one or more embodiments, the compensation circuit may be or include the voltage clamp circuit 106, further configured to be selectively activatable (e.g., by the logic circuit 103 via the auxiliary clamp activation signal CL2) even in the absence of an overvoltage across the driver sub-circuits 101 or 102 (Vm overvoltage). Therefore, the voltage clamp circuit 106 may be configured to operate "on demand" during the load current discharge phase, according to one or more control signals received from the logic circuit 103.

Additionally or alternatively, the compensation circuit may be or include a dedicated compensation sub-circuit (not visible in the figures annexed herein) provided in the driver circuit 10 and coupled to the power supply pin PS.

According to one or more embodiments of the present description, the compensation current may be generated to cancel out (e.g., compensate) the oscillatory effects in the power supply lines 16, 16R, and 16L due to the abrupt interruption of the load current. In particular, the compensation circuit may be activated in an ON-OFF mode so that a square current pulse is sunk from node 105 for a (short) period at the beginning of the load discharge phase (e.g., in response to the motor windings being forced in a short-circuit configuration).

Figure 4A:
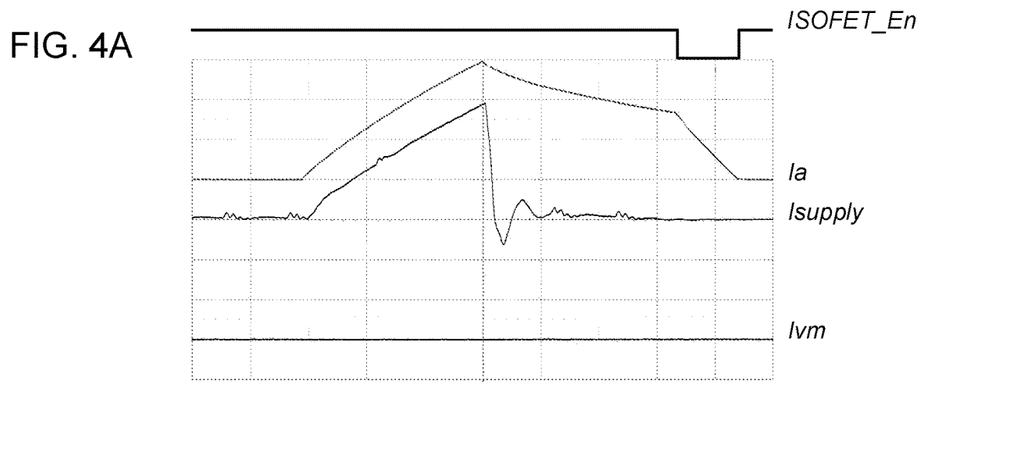
FIGS. 4A, 4B, and 4C are time diagrams exemplary of a load current, a supply current, and a compensation current during an inductive sense procedure of a BLDC motor according to one or more embodiments of the present description.
Figure 4B:
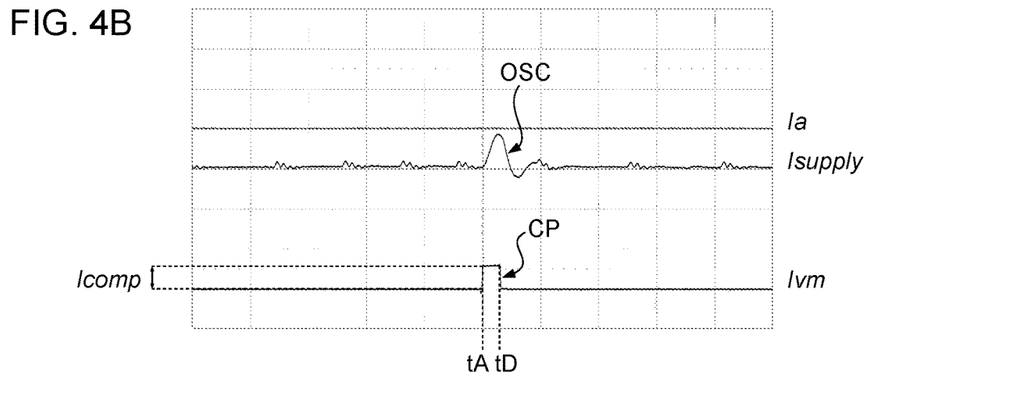
Figure 4C:
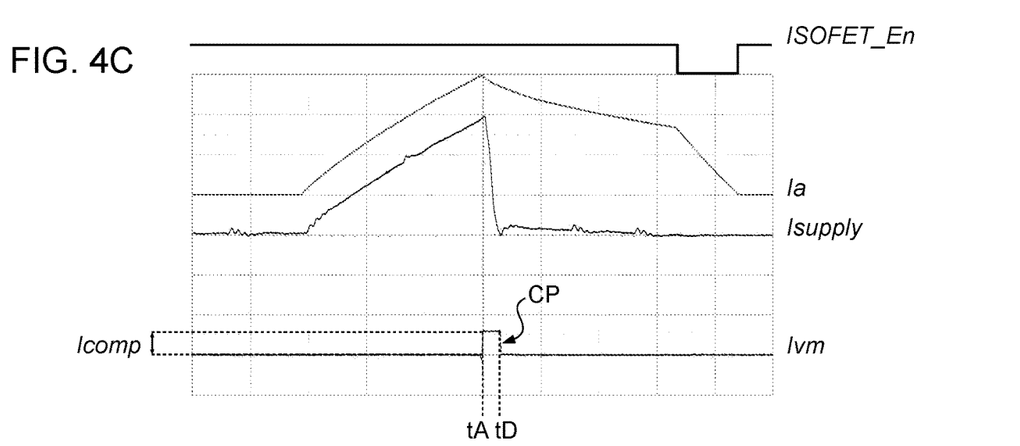

FIGS. 4A, 4B, and 4C are time diagrams exemplary of signals ISOFET_En, Ia, Isupply and Ivm that facilitate understanding of the operating principle of such embodiments.

FIG. 4A substantially corresponds to FIG. 3C and illustrates the undesirable generation of a negative current pulse in the power supply lines 16, 16R, and 16L in response to the start of the load current discharge phase, if no compensation current is sunk from node 105 as exemplified by current Ivm being steadily equal to zero.

FIG. 4B illustrates the effect on the supply current Isupply of sinking a compensation current pulse CP from node 105 (e.g., using the voltage clamp circuit 106 selectively activated for this purpose or utilizing a dedicated compensation circuit coupled to node 105). It is noted that sinking a compensation current pulse CP from node 105 produces an oscillation OSC of the supply current Isupply. By tuning the activation or deactivation timings (tA, tD) of the compensation circuit or by tuning the magnitude Icomp of the compensation current, an oscillation OSC having a similar amplitude and opposite phase with respect to the oscillation illustrated in FIG. 4A (due to the abrupt disconnection of the load) can be produced in the power supply line.

As exemplified in FIG. 4C, the combination of the two effects results in mitigating the negative current pulses in the power supply line. Satisfactory (e.g., complete) cancellation of negative current pulses may thus be sought by tuning (e.g., calibrating) the compensation current pulse (e.g., calibrating the magnitude Icomp or the duration tD−tA).

The duration of the compensation current pulse may advantageously be long enough to allow the supply current Isupply to reach zero (or close to zero) value during the load current interruption. In one or more embodiments (e.g., in hard disk drive applications), such duration may be in the range of a few tens of microseconds.

As exemplified in FIGS. 4A, 4B, and 4C, the duration of the compensation current pulse CP may be quite short, e.g., shorter than the spindle brake phase (during which the motor windings are set in a short-circuit configuration). In a variant of the embodiments disclosed above, the duration of the spindle brake phase may be advantageously reduced, e.g., down to matching the duration of the compensation current pulse CP, as exemplified in FIGS. 5A, 5B, and 5C.

Figure 5A:
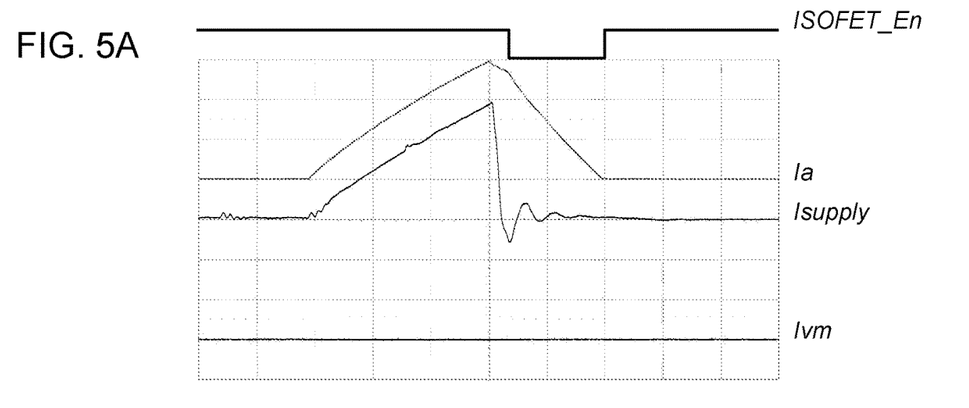
FIGS. 5A, 5B, and 5C are time diagrams exemplary of a load current, a supply current, and a compensation current during an inductive sense procedure of a BLDC motor according to one or more variant embodiments of the present description.
Figure 5B:
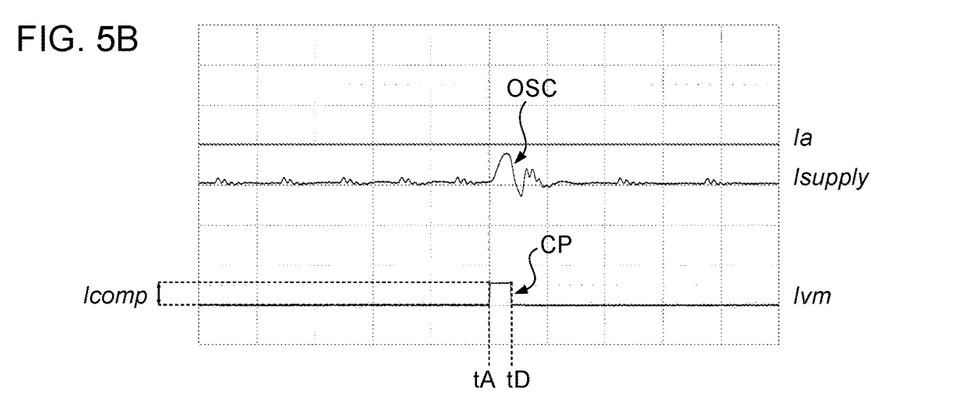
Figure 5C:
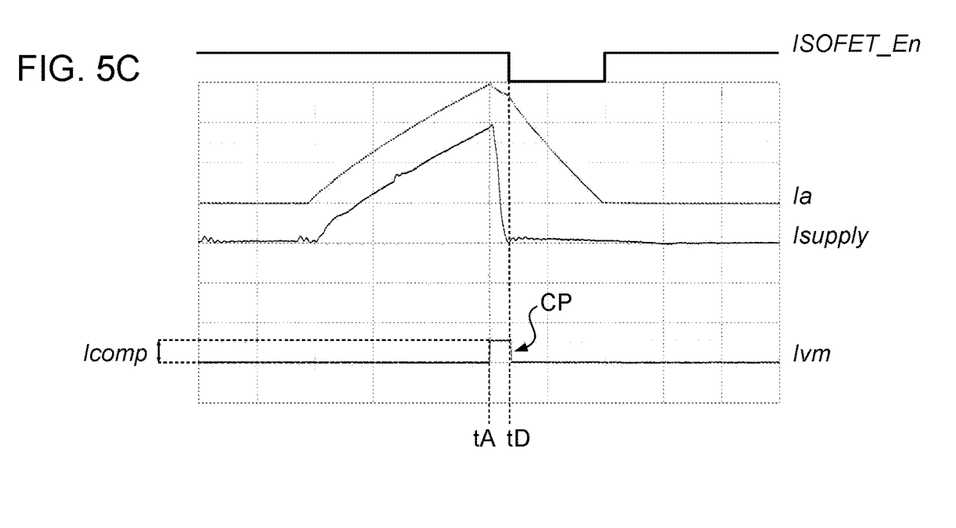

FIGS. 5A, 5B, and 5C are time diagrams exemplary of signals ISOFET_En, Ia, Isupply and Ivm that facilitate understanding of the operating principle of such variant embodiments.

FIG. 5A substantially corresponds to FIG. 4A and illustrates the undesirable generation of a negative current pulse in the power supply lines 16, 16R, and 16L in response to the start of the load current discharge phase if no compensation current is sunk from node 105 as exemplified by current Ivm being steadily equal to zero. Here, the spindle brake phase has a shorter duration compared to FIG. 4A.

FIG. 5B illustrates the effect of sinking a compensation current pulse CP from node 105 (e.g., using the voltage clamp circuit 106 selectively activated for this purpose or employing a dedicated compensation circuit coupled to node 105) on the supply current Isupply, similarly to FIG. 4B. Again, sinking a compensation current pulse CP from node 105 produces an oscillation OSC of the supply current Isupply, which can compensate for the oscillation illustrated in FIG. 5A provided that the compensation current pulse CP is calibrated.

As exemplified in FIG. 5C, combining the two effects results in the cancellation of the negative current pulses in the power supply line. In particular, the duration of the spindle brake phase may be as short as the duration of the compensation current pulse CP. Reducing (e.g., minimizing) the duration of the spindle brake phase may be advantageous insofar as it may result in a quicker inductive sense procedure. A quicker inductive sense procedure may be used in a startup phase during which multiple inductive sense procedures are executed (e.g., so-called "BUZZ" routines).

The amplitude of the compensation current pulse may depend on the inductive sense current peak or the method used for zeroing the current. The amplitude of the compensation current pulse may advantageously be in the range of the inductive sense current peak if the inductive sense method is one of those shown in FIG. 3A or 3B (insofar as the whole load current has to be managed), while the amplitude can be lower if the inductive sense method is the one shown in FIG. 3C (insofar as only the oscillation components due to 16R, 16L, C1, C2 have to be managed).

The duration of the compensation current pulse may advantageously be roughly as long as the time required by the supply current Isupply to reach zero (or close to zero) value. In one or more embodiments (e.g., in hard disk drive applications), such duration may be in the range of a few tens of microseconds.

According to other embodiments of the present description, the compensation current may be generated to avoid the propagation of a negative current pulse in the power supply line, even if the oscillatory effects due to the abrupt interruption of the load current are not canceled out. In particular, the compensation circuit may be activated in a controlled mode so that a current pulse with a steep rising edge and a controlled falling slew rate (e.g., triangular) is sunk from node 105 for a (short) period at the beginning of the load discharge phase (e.g., in response to the motor windings being forced in a short-circuit configuration). The controlled current pulse can be characterized by a maximum initial amplitude (or magnitude) and a controlled slew rate value during the falling (turn-off) phase.

Figure 6A:
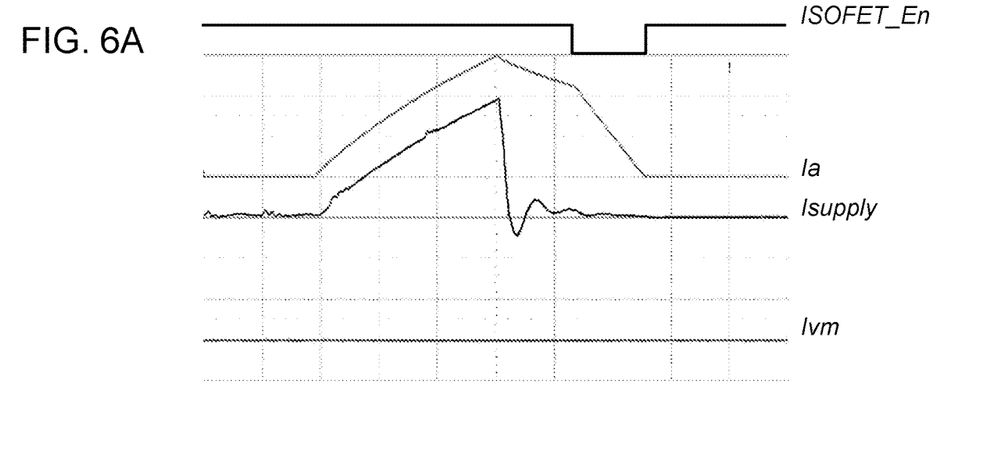
FIGS. 6A, 6B, and 6C are time diagrams exemplary of a load current, a supply current, and a compensation current during an inductive sense procedure of a BLDC motor according to other embodiments of the present description.
Figure 6B:
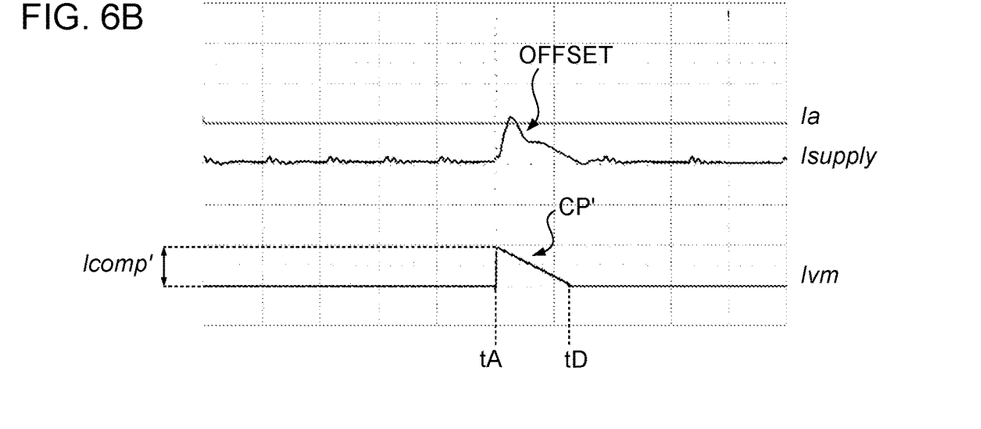
Figure 6C:
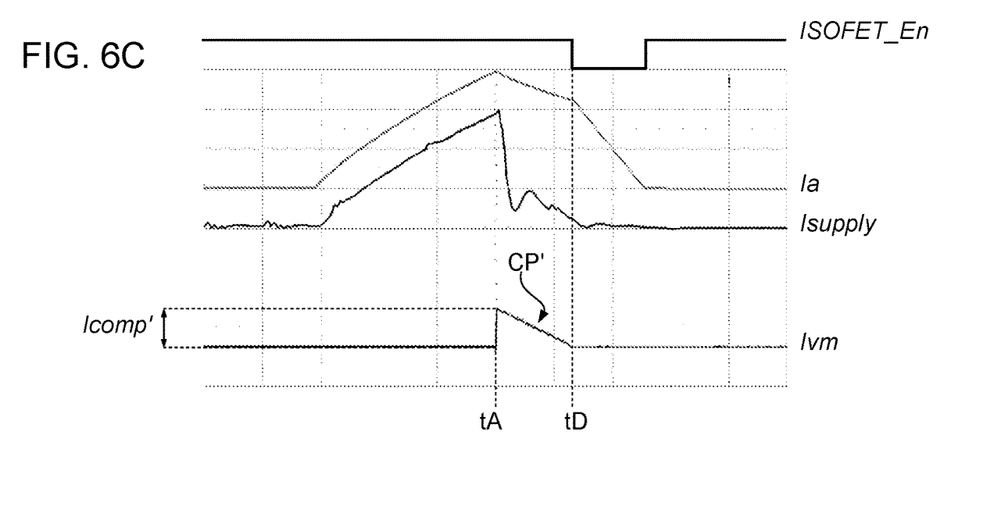

FIGS. 6A, 6B, and 6C are time diagrams exemplary of signals ISOFET_En, Ia, Isupply and Ivm that facilitate understanding of the operating principle of such embodiments.

FIG. 6A substantially corresponds to FIG. 4A and again illustrates the undesirable generation of a negative current pulse in the power supply lines 16, 16R, and 16L in response to the start of the load current discharge phase, if no compensation current is sunk from node 105 as exemplified by current Ivm being steadily equal to zero.

FIG. 6B illustrates the effect of sinking a compensation current pulse CP' with a controlled falling slew rate from node 105 (e.g., using the voltage clamp circuit 106 selectively activated for this purpose or employing a dedicated compensation circuit coupled to node 105) on the supply current Isupply. It is noted that sinking a compensation current pulse CP' with a controlled falling slew rate from node 105 produces a positive offset OFFSET of the supply current Isupply, which slowly decreases to zero.

As long as the magnitude of the positive offset OFFSET shown in FIG. 6B is higher than the magnitude of the negative oscillation of the supply current Isupply shown in FIG. 6A, the combination of the two effects results in the compensation of the negative current pulses in the power supply line, as exemplified in FIG. 6C. In particular, in the embodiment exemplified in FIGS. 6A, 6B, and 6C, the compensation current pulse CP' forces a positive offset of the supply current Isupply while the abrupt interruption of the load current would generate a negative pulse of the supply current Isupply, thereby avoiding the propagation of a negative current in the power supply lines 16, 16R, and 16L. Once the oscillations due to the interruption of the load current are naturally damped (e.g., dissipated), the compensation pulse CP' is slowly brought to zero in a controlled manner (e.g., with a controlled slew rate) to avoid producing further oscillations and thus softly zeroing the power supply current Isupply.

According to the embodiments described above, the compensation method may be advantageous insofar as it may not require calibration. In particular, it is sufficient for the compensation current pulse CP' to have: sufficient initial magnitude Icomp' to produce a positive offset OFFSET of the supply current Isupply having a magnitude higher than the magnitude of the negative oscillation of the supply current Isupply; and falling slew rate low enough to avoid producing further oscillations in the power supply lines 16, 16R, and 16L.

It may be sufficient to overestimate the magnitude of the negative current oscillations due to the interruption of the load current (e.g., concerning a typical use case) and to set a very low falling slew rate of the compensation current pulse CP' to meet the two conditions above.

FIGS. 7A to 7D are exemplary of different dimensioning of the compensation current pulse CP' and the corresponding effect on the supply current Isupply. The current pulses CP' in FIGS. 7A to 7D have the same slew-rate and different magnitude Icomp'.

Figure 7A:
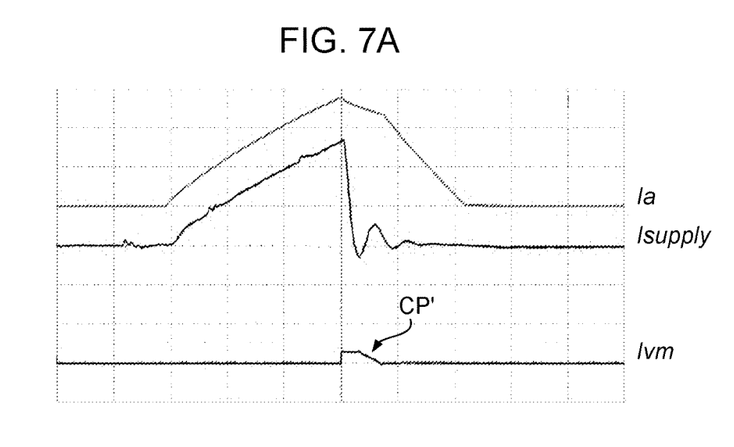
FIGS. 7A, 7B, 7C, and 7D are time diagrams exemplary of a load current, a supply current, and a compensation current during an inductive sense procedure of a BLDC motor according to various embodiments of the present description.

FIG. 7A is exemplary of a compensation current pulse CP' having a magnitude too low to avoid negative currents in the power supply line.

Figure 7B:
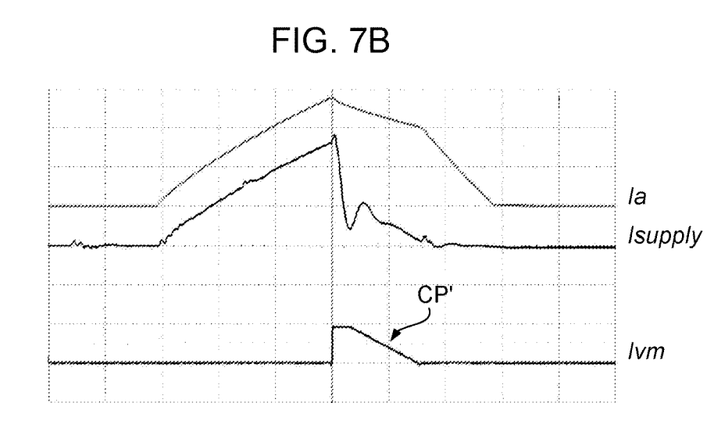

FIG. 7B is exemplary of a compensation current pulse CP' having a magnitude sufficient for avoiding negative currents in the power supply line.

Figure 7C:
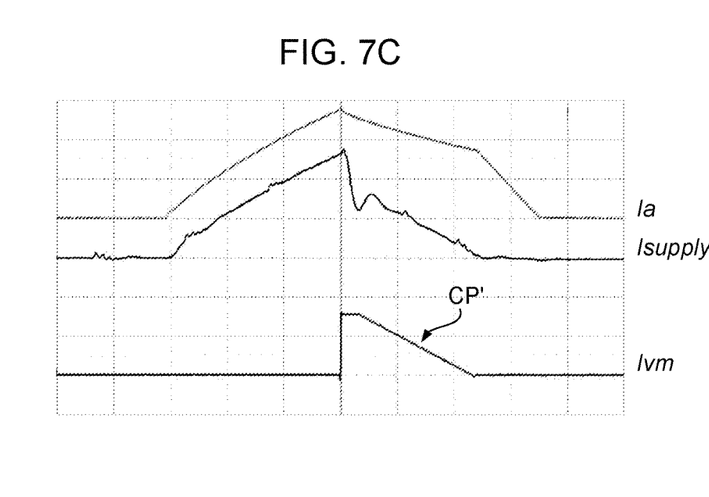
Figure 7D:
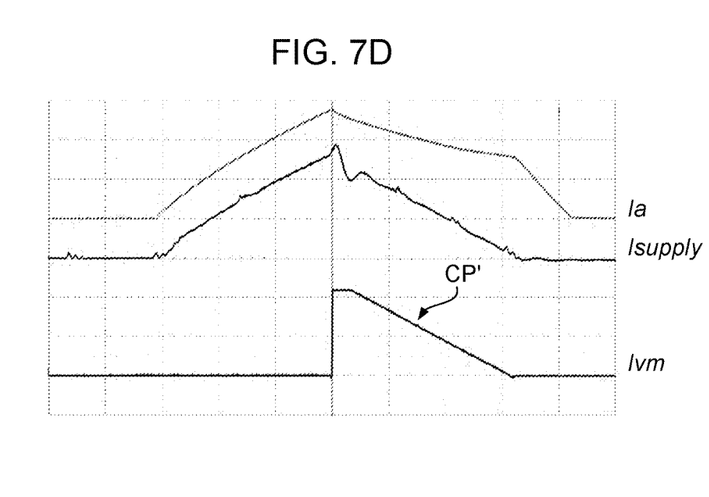

FIGS. 7C and 7D are exemplary of different compensation current pulses CP' having even higher magnitude. Precise calibration of the compensation current pulse CP' can thus be advantageously avoided insofar as overcompensation (as shown, for instance, in FIGS. 7C and 7D) does not negatively affect the performance of the driver circuit.

The minimum initial magnitude may depend on the inductive sense current peak and the method used for zeroing the current. The amplitude of the compensation pulse may advantageously be comparable to (e.g., in the same range as) the inductive sense current peak (e.g., 1 A to 3 A in hard disk drive applications) if the inductive sense method is one of those shown in FIG. 3A or 3B (where the whole coil current has to be managed). In contrast, the amplitude can be reduced if the inductive sense method is the one shown in FIG. 3C (where only the oscillation components due to 16R, 16L, C1, and C2 have to be managed). Experimental trials may be carried out in this second case to determine an estimated value. Purely by way of example, a minimum initial magnitude of approximately 0.5 A may be used in hard disk drive applications.

The fastest falling slew rate may be determined as a function of the application conditions. Experimental trials may be carried out to determine an estimated value. Purely by way of example, a slew rate equal to or lower than approximately 10 A/ms may be used in hard disk drive applications.

It is noted that the embodiments described with reference to FIGS. 6A-6C and 7A-7D have been disclosed, assuming that the duration of the spindle brake phase matches the duration of the compensation current pulse CP', similarly to the embodiments of FIGS. 5A-5C, which may be advantageous, e.g., in reducing the overall duration of an inductive sense procedure. However, in one or more embodiments, the duration of the spindle brake phase may be longer than the duration of the controlled compensation current pulse CP'.

Throughout the present description, reference has been made to driver circuit 10 for a three-phase BLDC motor 12 by way of non-limiting example only. The person skilled in the art will appreciate that one or more embodiments may be applied to any kind of driver circuit for an electrical load, where the issue of negative currents produced in the power supply line due to an abrupt interruption of the load current has to be mitigated.

One or more embodiments may thus provide the ability to mitigate (e.g., preventing) negative current pulses in the power supply line of a driver circuit for an electrical load when the load current is abruptly interrupted.

Without prejudice to the underlying principles, the details and embodiments may vary, even significantly, concerning what has been described by way of example only, without departing from the extent of protection.

Various embodiments and variants have been described. Those skilled in the art will understand that certain features of these various embodiments and variants may be combined, and other variants will occur to those skilled in the art. For example, other countermeasures than those described may be implemented.

Finally, the practical implementation of the described embodiments and variants is within the abilities of those skilled in the art based on the functional indications given hereabove.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method, comprising:
    coupling a power supply source to a power supply pin of a driver circuit;
    coupling an electrical load to an output pin of the driver circuit;
    producing, at a driver sub-circuit of the driver circuit, a driving signal for driving the electrical load;
    providing the driving signal to the electrical load via the output pin;
    modulating the driving signal to supply the electrical load with a load current and subsequently interrupt the load current; and
    sinking from the power supply pin, at a compensation circuit of the driver circuit, a compensation current pulse in response to the load current being interrupted.

2. The method of claim 1, wherein the compensation circuit comprises a voltage clamp circuit coupled to the driver sub-circuit, the method comprising selectively activating the voltage clamp circuit to sink the compensation current pulse from the power supply pin in response to the load current being interrupted.

3. The method of claim 1, wherein the compensation current pulse is a square compensation current pulse.

4. The method of claim 3, wherein the square compensation current pulse has a predetermined magnitude and duration.

5. The method of claim 1, wherein the compensation current pulse has a falling slew rate lower than a rising slew rate.

6. The method of claim 5, wherein the falling slew rate is at least ten times lower than the rising slew rate.

7. The method of claim 5, wherein the falling slew rate is at least one hundred times lower than the rising slew rate.

8. The method of claim 1, wherein modulating the driving signal comprises:
    applying a non-zero voltage between a first terminal and a second terminal of the electrical load in a first phase; and
    applying the same potential to the first terminal and the second terminal of the electrical load in a second phase such that the electrical load is set to a short-circuit configuration,
    wherein the method further includes sinking the compensation current pulse in response to the start of the second phase.

9. The method of claim 8, wherein modulating the driving signal further comprises setting the first terminal and the second terminal of the electrical load to a high impedance state in response to an expiration of the compensation current pulse in a third phase.

10. A circuit, comprising:
    a power supply pin couplable to a power supply source;
    an output pin couplable to an electrical load;
    a driver sub-circuit configured to:
        produce a driving signal at the output pin for driving the electrical load, and
        modulate the driving signal to supply the electrical load with a load current and to subsequently interrupt the load current; and
    a compensation circuit configured to sink a compensation current pulse from the power supply pin in response to the load current being interrupted.

11. The circuit of claim 10, wherein the compensation circuit comprises a voltage clamp circuit coupled to the driver sub-circuit, the circuit further comprising a logic circuit configured to selectively activate the voltage clamp circuit to sink the compensation current pulse from the power supply pin in response to the load current being interrupted.

12. The circuit of claim 10, wherein the compensation circuit is further configured to sink a square compensation current pulse from the power supply pin.

13. The circuit of claim 12, wherein the square compensation current pulse has a predetermined magnitude and duration.

14. The circuit of claim 10, wherein the compensation circuit is further configured to sink a compensation current pulse having a falling slew rate lower than a rising slew rate from the power supply pin.

15. The circuit of claim 14, wherein the falling slew rate is at least ten times lower than the rising slew rate.

16. The circuit of claim 14, wherein the falling slew rate is at least one hundred times lower than the rising slew rate.

17. The circuit of claim 10, wherein the circuit comprises a first output pin and a second output pin, and wherein the driver sub-circuit is further configured to:
    apply a non-zero voltage between the first output pin and the second output pin in a first phase; and
    apply the same potential to the first output pin and the second output pin in a second phase such that the electrical load is set to a short-circuit configuration,
    wherein the compensation circuit is further configured to sink the compensation current pulse in response to the start of the second phase.

18. The circuit of claim 17, wherein the driver sub-circuit is further configured to set the first output pin and the second output pin to a high impedance state in a third phase in response to an expiration of the compensation current pulse.

19. A device, comprising:
    a power supply source;
    an electrical load; and
    a circuit, comprising:
        a power supply pin coupled to the power supply source;
        an output pin coupled to the electrical load;
        a driver sub-circuit configured to:
            produce a driving signal at the output pin for driving the electrical load, and
            modulate the driving signal to supply the electrical load with a load current and to subsequently interrupt the load current; and
        a compensation circuit configured to sink a compensation current pulse from the power supply pin in response to the load current being interrupted.

20. The device of claim 19, wherein the compensation circuit comprises a voltage clamp circuit coupled to the driver sub-circuit, the circuit further comprising a logic circuit configured to selectively activate the voltage clamp circuit to sink the compensation current pulse from the power supply pin in response to the load current being interrupted.

* * * * *